June 24, 1969  R. L. TURPEN  3,451,705
CARGO CONTAINER DOOR LATCHING ARRANGEMENT
Filed Oct. 6, 1966
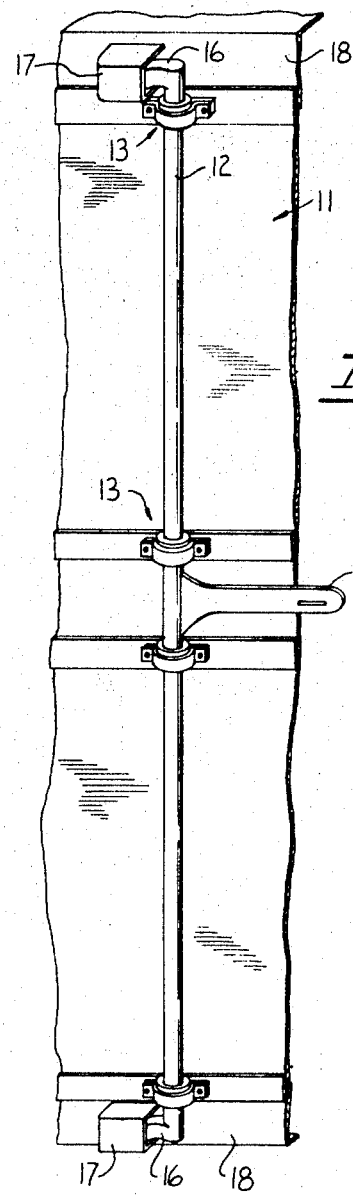
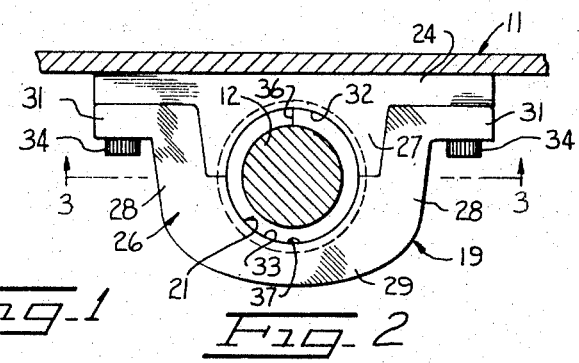
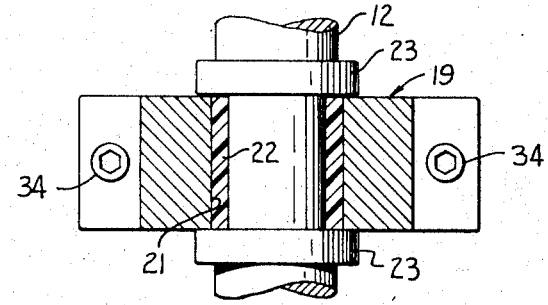
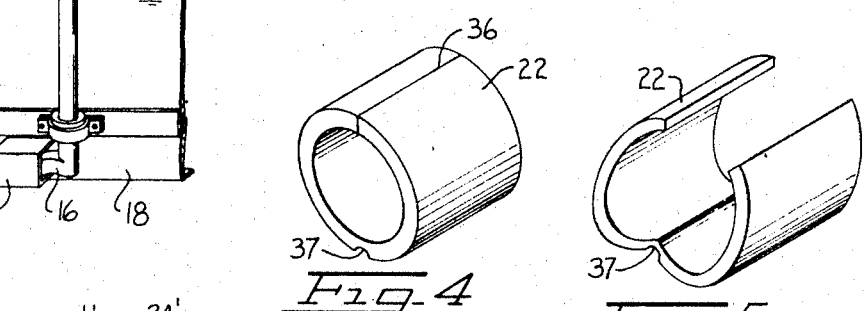
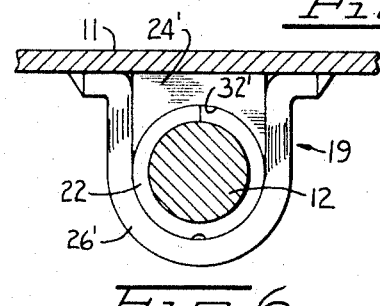
INVENTOR.
RUSSELL L. TURPEN
BY
ATTORNEYS

United States Patent Office 3,451,705
Patented June 24, 1969

3,451,705
CARGO CONTAINER DOOR LATCHING ARRANGEMENT
Russell L. Turpen, North Richmond, Calif., assignor to Compass Container Company, Inc., Richmond, Va., a corporation of California
Filed Oct. 6, 1966, Ser. No. 584,873
Int. Cl. E05c 3/04
U.S. Cl. 292—218      5 Claims

ABSTRACT OF THE DISCLOSURE

A cargo container door latching arrangement is described which includes a latching rod which is journalled upon the cargo container door by a plurality of bearings which are not subject to freezing or galling. Each of the bearings includes a bracket assembly secured to the door and made up of first and second separable elements which define a bore. A split hinged bushing of tough synethetic material is coaxially mounted within the bore of each of the bracket assemblies between the first and second elements. The latching rod passes through each of these bushings and has coaxially spaced collars which engage ends of the bracket assemblies to limit axial displacement of the rod relative to such bracket assemblies.

---

This invention relates generally to bearings, and is more particularly directed to a non-freezing, non-galling bearing.

In various applications, bearings are subjected to extreme environmental conditions which tend to freeze and/or gall the bearing in relatively short order. For example, bearings which are used on cargo containers to pivotally mount the latch rods of the doors thereof are typically subjected to extremes of hot and cold, rain, ocean spray, etc. during shipment of the container. Under such conditions, even frequent lubrication of the bearings does not prevent them from freezing and/or galling in a relatively short time. This is of course highly undesirable since there is a fair chance the bearings will be frozen when the container reaches its destination. Much difficulty might then be encountered in opening the doors of the container. Moreover, from the standpoints of the maintenance and replacement that are required, conventional bearings are disadvantageous for use with cargo containers and other objects which are subjected to extreme environmental conditions.

Therefore, it is an object of the present invention to provide an improved bearing which is non-freezing and non-galling under even the most extreme environmental conditions.

Another object of the invention is the provision of a bearing of the class described which is very easy to install.

Still another object of the invention is to provide a non-freezing and non-galling bearing of extremely simple, low cost design which is particularly well suited to the journalling of latch rods of cargo container doors.

It is a further object of the invention to provide a bearing of the class described which is greaseless.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a perspective view of a cargo container door latching arrangement employing bearings in accordance with the present invention.

FIGURE 2 is a plan view on an enlarged scale of one of the bearings.

FIGURE 3 is a sectional view taken at line 3—3 of FIGURE 2.

FIGURE 4 is a perspective view of a hinged split bushing of the bearing.

FIGURE 5 is a view similar to FIGURE 4, but illustrating the bushing in open condition.

FIGURE 6 is a plan view of a modified form of the bearing.

Referring now to FIGURE 1, there is shown a cargo container door 11 having a latching rod 12 journalled thereon for rotation about a vertical axis by means of a plurality of bearings 13. In a conventional manner the rod is provided with a radially projecting handle or hasp 14 centrally thereof. The opposite ends of the rod are formed with radial pins 16 projecting in a direction opposite to that of the hasp 14. The pins are received within receptacles 17 provided on upper and lower longitudinal members 18 of the body of the container when the hasp is positioned against the door, as shown. The rod thus latches the door in closed position. However, the rod may be rotated within the bearings to thereby pivot the pins out of engagement with the receptacles and unlatch the door.

Conventionally the bearings employed to journal the latching rods on the doors of a cargo container have been merely provided as metallic bushings traversed by the rods. As noted previously, even when such bearings are frequently lubricated, they are quite susceptible to freezing and/or galling after relatively short periods of exposure to the environmental conditions to which a cargo container is normally subjected. Thus, frequent maintenance and replacement of the bearings are normally required. Moreover, even then it may be extremely difficult to rotate the rod in the bearings to unlatch the door when the cargo container reaches its destination.

The foregoing problems are overcome in accordance with the present invention by means of the bearings 13 which are arranged to be non-freezing, non-galling, and greaseless. More particularly, as best shown in FIGURES 2 and 3, each bearing 13 includes an external bracket assembly 19 which may be welded or otherwise secured to the door 11. A bore 21 is defined through the bracket assembly, and in accordance with the particularly salient aspects of the invention, a bushing 22 of a tough synthetic material such as nylon is coaxially mounted within the bore. The bushing 22 is in turn traversed by the rod 12, and a metal-to-metal contact between the rod and bearing is thus avoided. The characteristics of the bushing material are such that the bearing surface thereby provided is non-freezing and non-galling and does not require lubrication.

It should be noted that the rod 12 is typically provided with pairs of coaxially spaced collars 23 for engaging the opposite ends of each bearing 13 and thereby preventing axial displacement of the rod. Such collars prevent direct insertion of the rod through the bore 21 and bushing 22. This difficulty is overcome by providing the bracket assembly 19 in the form of a split assembly comprising two separable elements 24, 26, and the bushing 22 in the form of a split hinged bushing which may be spread open to facilitate its placement about the rod. More particularly, the element 24 is preferably of rectangular block configuration including a tapered rectangular outwardly stepped portion 27 centrally of one face thereof. The element 26 is of generally U-shaped configuration including a pair of legs 28 and an interconnecting web 29 defining a recess complementary to the stepped portion 27 of the element 24 and engageable therewith. Flanges 31 outwardly turned from the free ends of the legs 28 engage the element 24 on opposite sides of the portion 27 when such portion is received in the recess. The portion 27 and web 29 are respectively provided with confronting semi-circular grooves 32, 33 which define the bore 21 when the elements 24, 26 are assembled. The elements may be removably secured in assembled relation as by means of bolts 34 extending through bores in the flanges 31 and engaging taps (not shown) provided in the element 24 on opposite sides of portion 27.

When regard to the split, hinged configuration of bushing 22, same is preferably provided with a part line 36 and diametrically opposed weakend section defined by a longitudinal external groove 37. Thus, the bushing may be spread open, as indicated in FIGURE 5, to permit its placement upon the rod 12 intermediate the collars 23. With the elements 24, 26 of bracket assembly 19 disassembled, the bushing may be engaged with the groove 32 of element 24. The groove 33 of element 26 may be in turn engaged with the bushing and the elements secured in assembled relation by means of the bolts 34, or equivalent means. The bushing is thus clamped between the elements of the bracket assembly and thereby retained in closed cylindrical configuration.

FIGURE 6 depicts a modified form of bearing in accordance with the present invention which is generally similar to that previously described, but differs slightly in the configuration of the bracket assembly. More particularly the modified bracket assembly 19' includes separable elements 24', 26'. However, the element 24' is in the form of a rectangular block having a semi-circular groove 32'. The element 26' is in the form of a clevis in that the legs and web are of uniform thickness. The legs of element 26' are relatively elongated compared to those of element 26 and engage the opposite ends of the element 24'. The outer ends of the legs and the interconnecting web then define the other half of bore 21 in place of the notch 33. The elements 24', 26' may be secured in assembled relation as by welding flanges at the free ends of the legs of element 26 to surfaces of the door on opposite sides of element 24' which is also secured to the door as by welding.

What is claimed is:

1. A cargo container having door latching arrangement including a latching rod journalled upon a door for rotation between a position wherein pins projecting from said rod are engaged with recesses defined on the body of said container and a position wherein the pins are disengaged from the recesses, a plurality of bearings mounted upon said door for journalling said rod, each of said bearings including a bracket assembly secured to said door of first and second separable elements defining a bore therethrough, a split hinged bushing consisting of a cylindrical tube of tough synthetic material coaxially mounted within said bore between said first and second elements and traversed by said rod, and said rod having coaxially spaced collars engaging ends of each of said bracket assemblies and each end of the bushing to limit axial displacement of said rod relative to such assemblies and axial displacement of said bushing relative to the bore of the elements.

2. The combination of claim 1, further defined by each bushing having a part line and a diametrically opposed weakened section.

3. The combination of claim 2, further defined by said bushing having an external longitudinal groove in diametrically opposed relation to said part line and defining said weakened section.

4. The combination of claim 1, further defined by said first element having a rectangular block configuration including a tapered outwardly stepped portion centrally of one face thereof, said second element having a generally U-shaped configuration including a pair of legs and an interconnecting web defining a recess complementary to said stepped portion and receiving same, said legs having outwardly turned flanges at their free ends secured to said first element on opposite sides of said stepped portion, said stepped portion and said web having confronting semi-circular notches defining said bore.

5. The combination of claim 1, further defined by said first element having a rectangular block configuration including a semi-circular groove in a face thereof, and said second element being in the form of a clevis having legs engaging opposite ends of said block and a web opposed to said groove and defining therewith said bore.

References Cited

UNITED STATES PATENTS

| | | | |
|---|---|---|---|
| 1,078,941 | 11/1913 | Monson | 292—218 |
| 1,830,956 | 11/1931 | O'Connor | 292—218 X |
| 1,952,112 | 3/1934 | Bartsch | 292—218 |
| 2,150,271 | 3/1939 | Dwyer | 292—218 X |
| 2,360,351 | 10/1944 | Kuhne | 292—218 |
| 2,746,429 | 5/1956 | Vann | 308—22 X |
| 2,985,494 | 5/1961 | Terhorst | 308—238 |
| 3,194,615 | 7/1965 | Weasler | 308—238 X |
| 3,302,988 | 2/1967 | Senter | 308—238 |
| 3,356,426 | 12/1967 | Fadow | 308—238 X |

EVERETTE A. POWELL, JR., *Primary Examiner.*

FRANK SUSKO, *Assistant Examiner.*

U.S. Cl. X.R.

308—15, 238

UNITED STATES PATENT OFFICE
CERTIFICATE OF CORRECTION

Patent No. 3,451,705

June 24, 1969

Russell L. Turpen

It is certified that error appears in the above identified patent and that said Letters Patent are hereby corrected as shown below:

In the heading to the printed specification, line 5, "Richmond, Va." should read -- Richmond, Calif. --.

Signed and sealed this 21st day of April 1970.

(SEAL)
Attest:

Edward M. Fletcher, Jr.
Attesting Officer

WILLIAM E. SCHUYLER, JR.
Commissioner of Patents